United States Patent [19]

Johnson

[11] 4,188,629
[45] Feb. 12, 1980

[54] PASSIVE NAVIGATION SYSTEM WITH FREQUENCY CODING

[75] Inventor: Robert H. Johnson, Scottsdale, Ariz.

[73] Assignee: Motorola, Inc., Schaumburg, Ill.

[21] Appl. No.: 706,659

[22] Filed: Jul. 19, 1976

[51] Int. Cl.$^2$ .................... G01S 9/233; G01S 9/56
[52] U.S. Cl. .................... 343/6.5 R; 343/17.1 PF; 343/17.2 PC
[58] Field of Search ...... 343/18 B, 17.2 PC, 17.1 PF, 343/6.5 R, 6.5 LC

[56] References Cited

U.S. PATENT DOCUMENTS

| | | | |
|---|---|---|---|
| 2,461,005 | 2/1949 | Southworth | 343/6.5 R |
| 3,263,227 | 7/1966 | Ferry et al. | 343/17.2 PC |
| 3,395,384 | 7/1968 | Tapply et al. | 343/6.5 R |
| 3,631,484 | 12/1971 | Augenblick | 343/6.5 R |
| 3,714,653 | 1/1973 | Thor et al. | 343/17.2 PC |
| 3,798,642 | 3/1974 | Augenblick et al. | 343/7 ED |
| 3,918,056 | 11/1975 | Merrick | 343/18 B X |
| 3,972,042 | 7/1976 | Johnson | 343/17.2 PC |

*Primary Examiner*—Malcolm F. Hubler
*Attorney, Agent, or Firm*—Eugene A. Parsons

[57] ABSTRACT

On a vehicle to be navigated, a transmitter for radiating a signal having a plurality of frequencies and a receiver tuned to receive a predetermined harmonic of each of the plurality of frequencies, discriminate between the predetermined harmonics, and determine the range of position markers reradiating each of the predetermined harmonics, with a plurality of passive markers, each having a nonlinear electrical response characteristic and each tuned to reradiate the predetermined harmonic of a different one of the plurality of frequencies when the radiated signal from the transmitter impinges thereon, fixedly mounted at predetermined positions relative to a desired course to be traveled by the vehicle.

6 Claims, 5 Drawing Figures

PASSIVE NAVIGATION SYSTEM WITH FREQUENCY CODING

BACKGROUND OF THE INVENTION

In many operations, such as off shore oil well drilling, ship movements along coast lines, rivers and inland lakes, accurate positioning of aircraft during periods of low visibility and for accurate mapping and the like, land vehicle location, and many similar activities, it is desirable to have an accurate navigation system which is relatively inexpensve and easily mounted on small vehicles. Prior art navigation systems utilized for these purposes require a transmitter and receiver aboard the vehicle and a series of transponders situated along the desired course. The transponders are miniature transmitter/receivers which are activated by a signal from the transmitter on the vehicle to retransmit a signal which can be utilized to calculate the range of the transponder from the vehicle. Because the transponders are active devices, they require internal power supplies and periodic servicing. In many instances the transponders must be positioned in remote sites with limited access and servicing can be extremely difficult and time consuming.

SUMMARY OF THE INVENTION

The present invention pertains to a passive marker navigation system with frequency coding wherein a transmitter and receiver are positioned aboard the vehicle and a plurality of passive position markers each having a nonlinear electrical response characteristic are mounted at predetermined positions relative to a desired course to be traveled by the vehicle or relative to a desired area in which the vehicle will travel. The transmitter radiates a pulsed signal having a plurality of frequencies, such as a carrier and double sidebands, and the markers are each tuned to reradiate a harmonic of a different one of the plurality of frequencies when the radiated signal from the transmitter impinges thereon. The receiver receives the reradiated hamonics, discriminates between markers by the different frequencies reradiated thereby and determines the range of each of the markers from the vehicle. A computer, which may be considered a portion of the receiver, calculates the position of the vehicle from the measured ranges of two or more position markers.

It is an object of the present invention to provide a new and improved passive marker navigation system with frequency coding.

It is a further object of the present invention to provide a new and improved navigation system wherein power sources at the position markers are eliminated and the logistics and cost of the system are considerably reduced.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
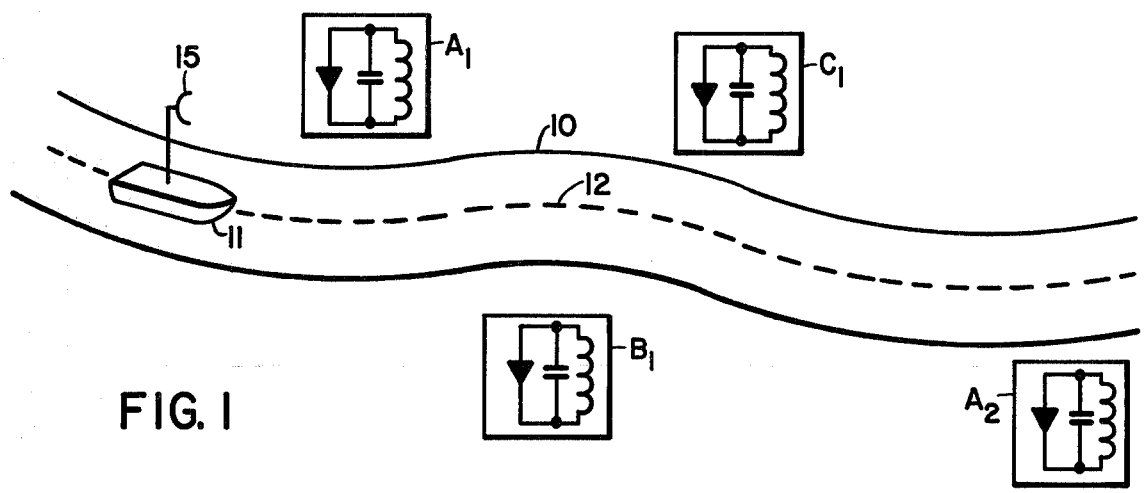
FIG. 1 is a pictorial view of a course to be navigated and the location of position markers relative to the course.

Referring specifically to FIG. 1, the number 10 indicates a river or the like with a vehicle 11, which may be a small boat, ship, etc., positioned thereon and a dotted line 12 indicating a desired course to be traveled by the vehicle 11. The vehicle 11 has an antenna 15 mounted thereon for use with a transmitter 16 and receiver 17 (shown and described in conjunction with FIG. 3), which transmitter 16 radiates signals to a plurality of passive position markers $A_1$, $B_1$, $C_1$, $A_2$, etc. The passive position markers $A_1$, $B_1$, $C_1$, $A_2$, etc. are located at predetermined positions along the course 12 and are spaced apart sufficiently so that knowledge of the distance to two or more markers can be used in standard triangulation calculations to determine the position of the vehicle relative to the position markers.

Figure 2:
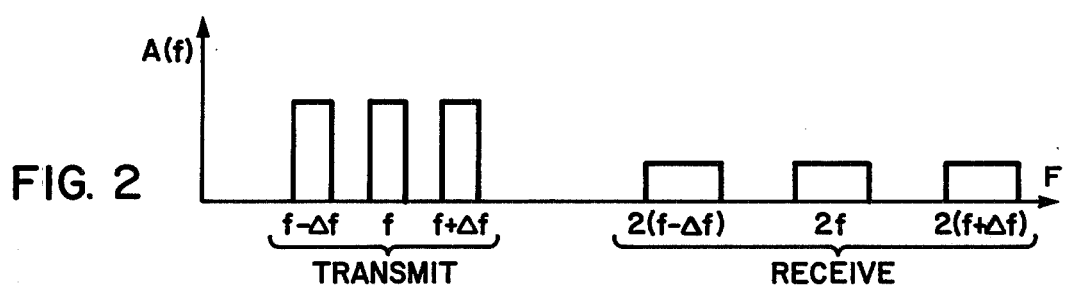
FIG. 2 is a graphic representation of the transmitted and received frequency spectrums.

Each of the markers $A_1$, $B_1$, $C_1$, $A_2$, etc. includes a passive element having a nonlinear electrical response characteristic such as, for example, a semiconductor diode or the like. Each of the markers further includes a tuned circuit, which may be a parallel tuned circuit in parallel with the semiconductor diode, which tuned circuit tunes the marker to reradiate a specific frequency when a predetermined frequency is radiated onto the marker. For example, the transmitter 16 connected to the antenna 15 on the vehicle 11 will transmit a carrier having a fundamental frequency and the marker $B_1$ is tuned to reradiate a second harmonic of the fundamental frequency. In the present invention, the signal transmitted by the transmitter 16 includes a plurality of frequencies such as, for example, a fundamental frequency and an upper and lower sideband, as illustrated in FIG. 2. The marker $A_1$ is then tuned to reradiate the second harmonic of the lower sideband, the marker $B_1$ is tuned to reradiate the second harmonic of the fundamental frequency and the marker $C_1$ is tuned to reradiate the second harmonic of the upper sideband. Markers $A_2$, $B_2$, $C_2$, $A_3$, etc. are then tuned to repeat the same frequencies and because of the distance between the markers little or no interference will be prevalent. FIG. 2 illustrates the fundamental frequency, labelled f, the lower sideband, labelled $f - \Delta f$, the upper sideband labelled $f + \Delta f$, and the second harmonics of each of these frequencies labelled $2f$, $2(f - \Delta f)$ and $2(f + \Delta f)$, respectively.

Figure 3:
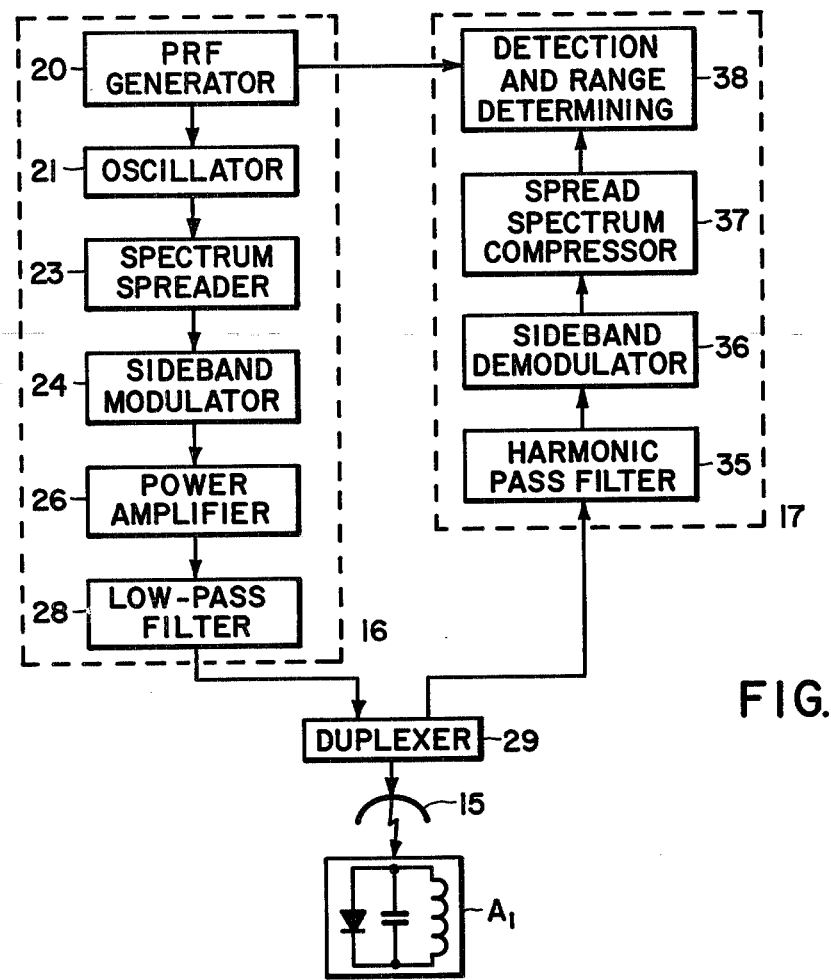
FIG. 3 is a block diagram of a transmitter/receiver which may be used in a passive marker navigation system embodying the present invention.

Referring specifically to FIG. 3, a pulse repetition frequency generator 20 in the transmitter 16 supplies periodic modulating pulses to an oscillator 21. The pulses of carrier frequency from the oscillator 21 are applied to a spectrum spreader 23 which may be, for example, a surface acoustic wave device or the like. The spectrum spreader 23 characteristically sweeps the frequency over a desired band and also causes a time delay so that the effect is to expand the width of the output pulse therefrom. Therefore, the resulting signal has a relatively low instantaneous power value, but it is radiated for a correspondingly long time period. This frequency and time expanded signal is applied to a sideband modulator 24, which is utilized to bring the power in the carrier and the upper and lower sidebands into general conformity, as illustrated in FIG. 2. The spread signal, including the carrier or fundamental and the upper and lower sidebands, is applied to a power amplifier 26, which power amplifies the signal and applies it through a low pass filter 28 and duplexer 29 to the antenna 15. By use of the spread spectrum, transmitter peak power requirements are reduced.

The multi-frequency signal from the antenna 15 impinges upon a plurality of the position markers simultaneously (only marker $A_1$ is illustrated in FIG. 3 for exemplary purposes) and each marker reradiates a predetermined harmonic, in this embodiment the second harmonic, of a predetermined one of the plurality of frequencies in the radiated signal. The radiated signal from the diode markers has been found to be linear enought to utilize the spread spectrum needed to reduce transmitter peak power requirements and still radiate sufficient harmonics. The reradiated signal from the marker is received by the antenna 15 and passes through the duplexer 29 to a harmonic pass filter 35 in the receiver 17. The signal from the harmonic pass filter 35 is then passed through a sideband demodulator 36 to a spread spectrum compressor 37. The spread spectrum compressor 37, may be, for example, a second surface acoustic wave device designed to have the inverse delay versus frequency characteristics of the spectrum spreader 23 in the transmitter 16. The result of this time compression is to provide an output pulse of short duration and very high relative amplitude to detection and range determining circuits 38. The periodic pulses from the PRF generator 20 are also supplied to the circuits 38 so that ranges can be calculated from the elapsed time between transmitter pulse and signal return. The ranges from the circuits 38 can then be applied to a computer or the like for computing the position of the vehicle 11 relative to the various markers. The spectrum spreading and compressing techniques accomplished in circuits 23 and 37 are explained in more detail in U.S. Pat No. 3,897,917, entitled "Weapon Delivery System", issued Aug. 5, 1975 and assigned to the same assignee. The sideband modulator 24 and demodulator 36 are utilized to modify the frequencies in the transmitter 16 and receiver 17 so that the signal from the spectrum spreader 23 and the signal applied to the spectrum compressor 37 are compatable with the remainder of the circuitry.

Figure 4:
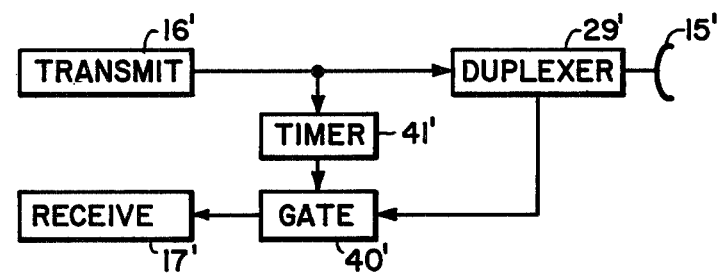
FIG. 4 is a block diagram of a transmitter/receiver similar to FIG. 3 including a gating circuit.
Figure 5:
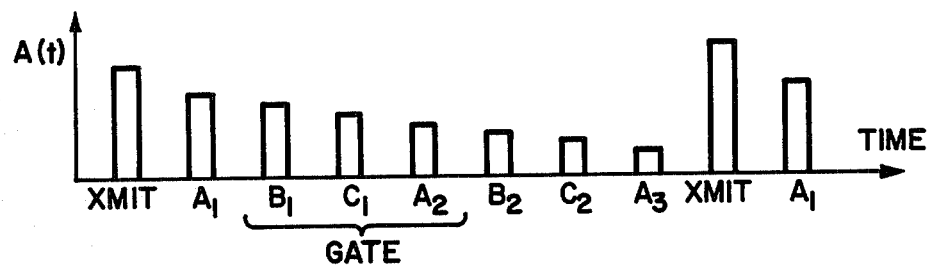
FIG. 5 is a graphic representation illustrating the operation of the gating circuit in the embodiment of FIG. 4.

Referring specifically to FIG. 4, a transmitter 16' and receiver 17' are illustrated which are similar to the transmitter 16 and receiver 17 of FIG. 3. In this embodiment, the output of the transmitter 16' is applied to an antenna 15' through a duplexer 29' and the reradiated signals from markers, received by the antenna 15', are applied through the duplexer 29' to a gate 40'. The gate 40' is operated by a timer 41' which is in turn operated by the output pulse from the transmitter 16'. The timer 41' may be, for example, a clock and shift register which is reset by each output pulse from the transmitter 16' and which provides a window during which time the gate 40' is activated to allow signals from the duplexer 29' to pass therethrough to the receiver 17'. Generally, the timer 41' is adjustable so that the width of the window is sufficient to allow the desired number of marker signals to pass therethrough. For example, in FIG. 5 the gate 40' is activated for a length of time sufficient to allow signals from three gates at a predetermined distance from the vehicle 11 to pass therethrough. Thus, by apropriate range gating unwanted signals from markers can be rejected and interference from markers which reradiate the same frequency is eliminated.

Thus, an improved passive navigation system with frequency coding is disclosed wherein a plurality of markers can be located at predetermined positions along desired navigation courses, including remote sites with limited access, and no power supplies or servicing are required. Further, the electronic equipment carried aboard the vehicle to be navigated can be constructed relatively inexpensively so that the entire system is relatively inexpensive and much simpler than prior art systems. Also, the reliability is increased since the position markers are passive and do not require power supplies or servicing. Thus, while I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:

1. A passive marker navigation system with frequency coding comprising:
   (a) transmitting means mounted on a vehicle to be navigated for radiating a signal having a plurality of frequencies said transmitting means including apparatus for modulating the signal on and off in pulses at a predetermined repetition rate and further apparatus for spreading the spectrum of the radiated signal during each of the pulses;
   (b) a plurality of passive position markers each having a non-linear electrical response characteristic and tuned to reradiate a harmonic of a different one of the plurality of frequencies when the radiated signal from said transmitting means impinges thereon;
   (c) said markers being fixedly mounted at predetermined positions relative to a desired course to be traveled by the vehicle; and
   (d) receiving means mounted on the vehicle for receiving the reradiated spread spectrum harmonics, compressing and detecting the reradiated spread spectrum harmonics, discriminating between said markers, and determining the range from the vehicle of each of said reradiating markers.

2. A passive marker navigation system as claimed in claim 1 wherein the passive markers include semiconductor diodes.

3. A passive marker navigation system as claimed in claim 1 wherein the transmitting means includes apparatus for radiating at least two of a carrier, an upper sideband, and a lower sideband.

4. A passive marker navigation system as claimed in claim 3 wherein the transmitting means includes apparatus for bringing the power in each of the plurality of frequencies into general conformity.

5. A passive marker navigation system as claimed in claim 1 wherein additional pluralities of passive position markers are used with each plurality having a similar number of markers and similar markers in each of the pluralities are tuned to similar frequencies with each of the pluralities of passive markers being geometrically separated.

6. A passive marker navigation system as claimed in claim 5 wherein the receiving means includes gating means for allowing the passage of signals from only a predetermined range approximately equal to the distance between markers in a single plurality.

* * * * *